Nov. 25, 1947.   O. R. NEMETH   2,431,669
VERTICAL ADJUSTMENT DEVICE
Filed May 22, 1944
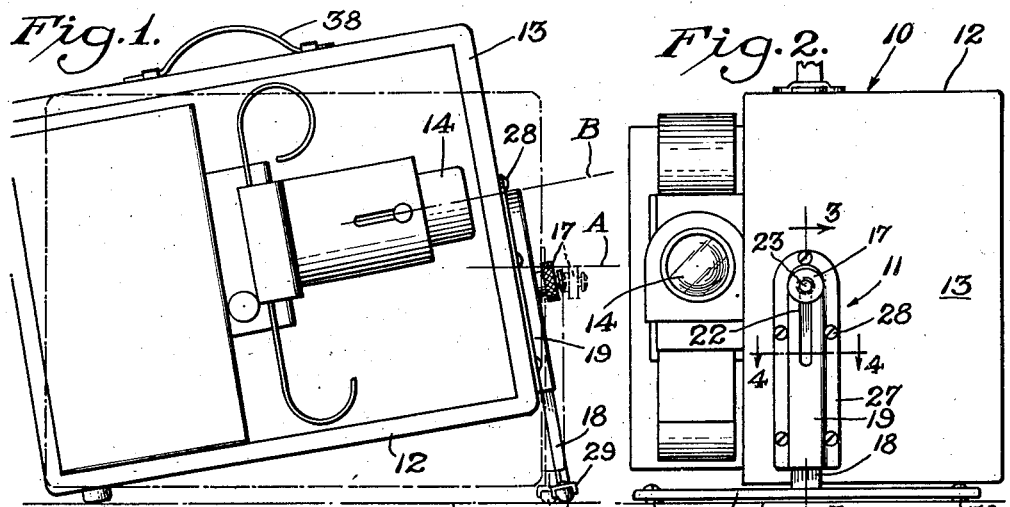
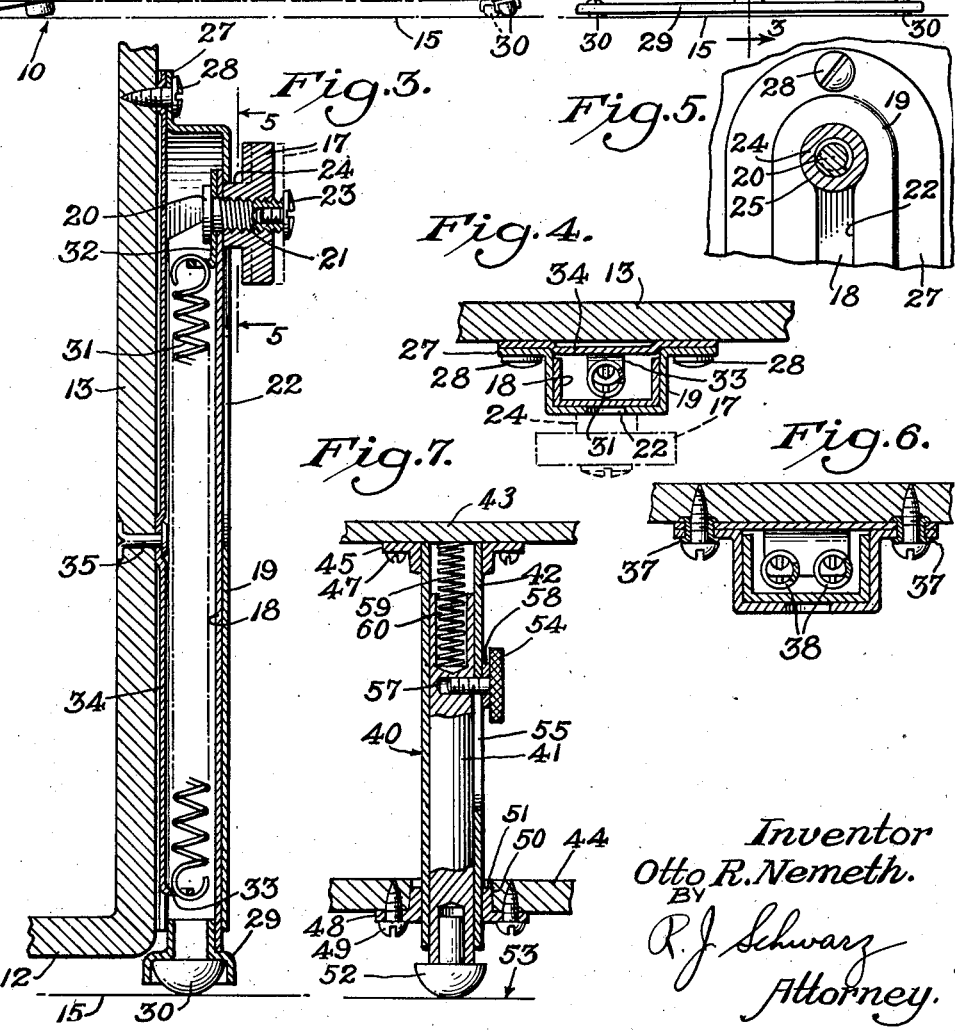
Inventor
Otto R. Nemeth.
BY
R. J. Schwarz
Attorney.

Patented Nov. 25, 1947

2,431,669

UNITED STATES PATENT OFFICE 2,431,669

VERTICAL ADJUSTMENT DEVICE

Otto R. Nemeth, Chicago, Ill.

Application May 22, 1944, Serial No. 536,724

11 Claims. (Cl. 248—161)

This invention relates to improvements in vertical adjustment devices and more particularly concerns such devices especially well adapted for tilting the projection end of a portable type projector for vertically centering an image projected thereby upon a screen.

Most prior devices of this kind have been characterized by micrometer or other screw adjustments which are slow, tedious, and generally of unduly limited range.

An important object of the present invention is to provide a vertical adjustment device which is at least semi-automatic in operation and with which adjustment can be effected quite speedily and with minute accuracy.

Another object is to provide a semi-automatic vertical adjustment device that is capable of being readily adapted for use with projectors of a large range of different weights.

Another object is to provide a vertical adjustment device which is counterbalanced to operate smoothly and uniformly and to enable adjustments to be made with a minimum of manipulation or physical effort on the part of the operator.

Another object is to provide a vertical adjustment device which is susceptible of being constructed largely of sheet material or standard and readily available shapes, for economical mass production.

Still another object of the invention is to provide a vertical adjustment device operable by simple rectilinear sliding of parts with various adjustments effected and maintained frictionally.

Other objects, features and advantages of the invention will be readily apparent from the following description and the accompanying sheet of drawings in which:

Figure 1 is a more or less diagrammatic side elevational view of a projector equipped with a vertical adjustment device embodying the features of the invention.

Fig. 2 is a front elevational view of the projector and the adjustment device.

Fig. 3 is an enlarged vertical sectional view through the adjustment device taken substantially along line 3—3 of Fig. 2.

Fig. 4 is a horizontal sectional view, on an enlarged scale, taken in substantially the plane of line 4—4 of Fig. 2.

Fig. 5 is a fragmentary vertical sectional view taken substantially in the plane of line 5—5 of Fig. 3.

Fig. 6 is a horizontal sectional detail view taken in a similar plane as Fig. 4 but showing a slightly modified form of the invention.

Fig. 7 is a vertical sectional view of a further modified form of vertical adjustment device embodying the features of the invention.

An important application of my invention is to the attainment of quick and accurate vertical or tilting adjustment of portable projectors to effect vertical centering of the projected image upon the screen toward which the projection beam of the projector is directed. In Figs. 1 and 2 is shown, merely by way of example, and to a considerable extent diagrammatically, a strip film projector 10 carrying a vertical adustment device 11 embodying the features of my invention. Any other type of projector such as a moving picture projector or magic lantern or a slide projector may of course be equally as well provided with the vertical adjustment device for the same purpose.

The projector 10 is housed within a casing 12 which has a front wall 13 and is equipped to support various apparatus, including an objective 14, involved in the projection of images carried upon strip film. Since a supporting surface 15 upon which the projector 10 may be set in projecting relation to a screen (not shown) may not be at the correct height or of the right slope to conform with requirements for accurate vertical centering of the projected image upon the screen it is highly desirable, if not imperative, to have the front end of the projector tiltable for vertical adjustment of the image.

Such vertical tilting adjustment of the projector is accomplished by means of the adjustment device 11 which in the present instance is adapted for a very wide range of tilting as indicated in Fig. 1 where a line A represents the center line of the objective 14, and thus of the projected image, when it is parallel to the supporting surface 15 in the untilted condition of the projector. In contrast, line B represents the center line of the objective 14 in the extreme uptilted condition of the projector. By use of my invention these and any minute vertical adjustments intermediate these extremes are attainable quickly, easily, and in such a simple, semi-automatic manner as to be performable by anyone responsive to the simplest sort of directions.

To this end, the vertical adjustment device 11 is equipped with simple means quickly manipulable with a minimum of effort or demand upon mechanical ability to effect adjustment. Such means may comprise a single rotatable screw element 17 carried by one of a pair of telescopically cooperating vertically elongated members 18 and 19 which may be formed from sheet metal or suitable thermo-plastic material and adapted to be held frictionally in adjusted relation through the medium of the element 17. The construction and arrangement are such that merely by digitally turning the rotatable screw element 17 slightly in one direction, herein counter-clockwise, the members 18 and 19 are released for adjustment purposes and then by returning the screw element clockwise to the original tight relationship the telescopic members are secured in fixed adjustment. In a simple, light weight but quite strong construction, these desirable results are obtained by a longitudinally slidable, nested channel shape formation of the members 18 and 19, with the member 18 received within the channel of the member 19 and carrying the adjusting screw element 17 (Figs. 3 and 4). The member 18 is preferably approximately as long as the member 19, is adapted to and preferably normally does project from the lower end of the member 19, and carries rigidly at or adjacent to its upper or inner end a stud 20 having a threaded stem 21 projecting out through a vertical, preferably centered slot 22 in the web of the member 19. The slot 22 is of ample length to enable relative telescopic sliding of the members 18 and 19 throughout the desired adjusting range, the limits A and B (Fig. 1) of which are defined by engagement of the respective ends of the slot by the stud 20. By virtue of the channel-shape construction of the members 18 and 19, and ample coactive interengagement of the members, amounting to preferably more than half their respective lengths even when fully projected, the device is capable of withstanding unusual transverse strains. In the present instance, the adjusting element 17 is in the form of a knurled nut threaded onto the threaded stem 21 which is slightly longer than the thickness of the thumb nut 17. A limit upon the unscrewing movement of the thumb nut 17 is defined by a retaining screw 23 axially threaded into the end of the stem 21. To retain the members 18 and 19 in any adjusted relationship, the inner face of a hub 24 on the thumb nut 17 is adapted to be driven, by screwing down the nut 17, against the outer face of the outer member 19 at opposite sides of the slot 22 (dot dash outline of Fig. 4) while at the same time the web of the member 18 is drawn by the stud 20 tightly against the inner face of the web of the member 19. This frictionally jams the members 18 and 19 tightly and effectively together against relative longitudinal displacement from adjustment.

In the substantially fully telescoped relationship of the adjustment members 18 and 19 they are adapted to be locked against any possibility of accidental protraction. This is accomplished by interlocking the hub 24 with the member 19 by driving the thumb nut 17 to extend the hub into a terminal enlargement 25 of a diameter just large enough to receive the hub at the upper end of the slot 22 (Fig. 5).

For the purpose of securing the device to the front wall 13 of the projector, the outer telescopic member 19 is preferably formed with a lateral attachment flange 27 adapted to receive screws 28. Where the projector wall 13 is formed of wood, the screws 28 may be wood screws driven directly into the wall panel as indicated in Fig. 3. Such attachment of the device is preferably effected on the vertical median plane through the center of mass of the projector and with the lower end of the device at or adjacent to the lower edge of the front wall 13.

For stability against lateral tipping and to enable the adjustment device 11 to support the projector without marring the surface 15, a foot 29 provided with rubber or other suitable casters 30 is carried by the lower end of the inner or protractable adjusting member 18. As seen in Figs. 2 and 3, the foot member 29 is preferably in the form of a horizontal, downwardly opening channel bar of ample length to afford the requisite stability, intermediately secured to the lower end of the bar 18 in any suitable manner, as by welding, brazing, or cementing or fusion where the parts are of a plastic substance.

It will thus be apparent that by protracting the inner adjusting member 18 within the range permitted by the stud 20 and the slot 22, tilted adjustment of the projector 10 can be attained from the broken line to the full line position in Fig. 1 or any intermediate position, and such adjustment can then be maintained indefinitely by tightening the thumb nut 17. However, due to the weight of the fore part of the projector, all of which is carried through the foot 29 by the telescoped adjustment members 18 and 19, accurate adjustment would undoubtedly, without some mechanical assistance in effecting elevation, be somewhat inconvenient due to the necessity for vertically lifting such weight.

Accordingly, the adjustment device 11 is provided with counterbalancing means which will to a substantial extent at least overcome the weight of the projector in effecting adjustments. Herein the counterbalancing means comprises a coiled tension spring 31 (Figs. 3 and 4) anchored at its upper end to a bracket 32 carried by the inner telescopic member 18 while at its lower end the spring is secured to a right angular attachment flange 33 formed integral with an anchoring plate 34. The anchoring bracket 32 may conveniently be assembled with the member 18 together with the stud 20 and welded or otherwise permanently affixed to the member 18. The anchoring plate 34 may be secured to the front wall 13 of the projector independently of the telescopic members 18 and 19 by means such as rivets 35 (Fig. 3). On the other hand, the plate 34 may be secured as a closure in unitary assembly with the outer adjustment member 19 in the manner shown in the modified form of Fig. 6 wherein grommet type rivets 37 are utilized at the screw holes in the attachment flange to secure the anchoring plate to the attachment flange of the outer member. The anchoring plate is maintained by the sides of the outer member 19 clear of the inner member 18.

The length and tension of the counterbalancing spring 31 is preferably such that it will normally tend to effect protraction of the inner telescoped member 18 to the limit permitted by the adjustment slot 22. Furthermore, the tension loading of the spring 31 is preferably so conditioned with respect to the weight of the projector as to enable automatic upward projection of the member 19 relative to the supporting base 15 and also to the base-held inner member 18, thus lifting the front end of the projector to at least half the permissible vertical extent of adjustment when the telescoped adjustment members 18 and 19 are released for free longitudinal relative sliding movement. This is within approximately that portion of the adjustment range which will normally be most used. Where adjustment is required from above the half way mark to the upper limit B of the adjustment range a slight upward lift on the projector, as for example through the medium of a handle 38' on top of the projector, supplementing the force of the spring 31 will easily and smoothly attain the precise adjustment required. Lower adjustments than the middle of the range can be obtained conveniently by merely pushing down on the front of the projector against the tension of the spring 31 until the required adjustment has been reached. Any such adjustment is then retained by tightening the thumb nut 17. When it is desired to lock the adjustment device 11 in non-tilting condition for storage or shipment, the front of the projector is pushed down after loosening the thumb nut 17 until the hub 24 registers with the locking terminal opening 25 and the thumb nut 17 is screwed in to interlock the same. There will then be no danger of the inner member 18 being projected by the loaded spring should the thumb nut 17 be jarred loose.

For such applications as involve relatively heavy apparatus, of which moving picture apparatus provides an example, the counterbalancing spring load may be multiplied as desired. In the modified form of Fig. 6, for example, a pair of springs 38 has been provided to double the counterbalancing potential as compared with the device as shown in Figs. 3 and 4.

A slightly modified form of the invention, which has been found particularly suitable for applications involving but relatively light weight to be counterbalanced, is shown in Fig. 7 in which a vertical adjustment device 40 comprises, in its principal elements, telescopically cooperating inner and outer cylindrical members 41 and 42. In this instance the outer member 42 is a tube and serves as a vertical supporting post for means such as a platform 43 located in vertically spaced relation above a base panel 44. The platform 43 and the base 44 may be part of a projector construction. Attachment of the upper end of the tube 42 to the platform 43 is through the medium of a flange 45 secured to the platform by means such as screws 47. Adjacent to its lower end the tube 42 is secured to the base panel 44 through the medium of a flange 48 attached to the panel by means such as screws 49. The flange 48 serves also as centering means for the tube 42 within an aperture 50 in the base panel, an annular tube-embracing flange portion 51 providing a centering spacer driven tightly into the bore of the aperture.

In this instance, the telescoping member 41 is a rod having its lower end projecting from the lower end of the outer tube 42 and preferably carrying a caster 52 engageable with a supporting surface 53. Adjacent to its upper or inner end, the inner member 41 carries means by which relative telescopic adjusted relation of the adjustment members 41 and 42 is effected. In the present instance such means comprises knurl-headed thumb screw 54 having its shank extending through a vertical adjustment slot 55 in the tube 42 and threaded into a lateral bore 57 in the rod body of the member 41. When the adjustment thumb screw 54 is loosened, the members 41 and 42 are adapted to be telescopically adjusted within the limits permitted by the adjustment slot 55 and the thumb screw shank. Any adjusted relationship can then be maintained by tightening the adjustment thumb screw 54 against a spacer 58 coaxial with the screw shank and bearing frictionally against the outer surface of the tube 42 at opposite sides of the slot 55. This draws the contiguous faces of the members 41 and 42 into tight frictional interengagement.

Counterbalancing means for the device 40 comprises a coiled compression spring 59 which may bear at its upper end against the contiguous lower face of the platform 43 and at its lower end extends down into and bears against the base of a socket 60 formed in the upper end of the inner adjustment member 41. Through this arrangement, the counterbalancing spring 59 normally tends to project the inner member 41 from the outer adjustment tube 42, or conversely tends to push the tube, and thus the assembly in which the tube forms a post, upwardly from the surface 53 upon which the lower end of the inner member 41 rests through the caster 52. Thus, similarly as in the forms of Figs. 1 to 6, the device to be adjusted is normally automatically elevated to a partial extent by the counterbalancing spring 59 when the thumb screw 54 is loosened, and very little lifting or depressing effort will attain the precise vertical adjustment either way from the counterbalanced position.

It may be observed that the form of the invention shown in Figs. 1 to 6 may be readily adapted for similar use as the modified form of Fig. 7. On the other hand the form of Fig. 7 may readily be adapted for application in similar environment as the forms of Figs. 1 to 6. In every instance, the various component elements are of such simple form as to be readily manufactured by simple mass production methods from readily available materials and such standard items as casters and springs. Manufacturing tolerances can be quite liberal, and in any embodiment of the invention operation is smooth, easy and trouble free. A wide range of minutely incremental vertical or tilting adjustment is attainable with utmost facility.

While I have illustrated and described certain preferred embodiments of my invention, it is to be understood that I do not thereby intend to limit my invention to the specific forms disclosed, but contemplate that various modifications, substitutions and alternative constructions may be effected without departing from the spirit and scope of the invention as defined in the appended claims.

I claim:

1. In combination in a device adapted for tilting vertical adjustment of apparatus, such as a projector, a pair of telescopically cooperative members arranged to be disposed vertically in association with the apparatus, means for securing one of said members to the apparatus, the second of the members being arranged to project beyond the lower end of said first member, counterbalancing means for normally at least partially counteracting the weight of the apparatus to cause the latter to be lifted by said first member when the lower end of said second member is held against downward movement as by engagement with a supporting surface, said counterbalancing means comprising a tension spring located within and anchored at one end to the second of the telescoping members, and at its other end anchored for tensioning independently of said second member and in fixed relation to said first member, and means for securing the telescopic members in any incremental adjustment thereof and at the same time rendering the counterbalancing means dormant whereby to fix the vertical adjustment of the apparatus.

2. In combination in an adjustment device of the character described, a pair of telescopically related members, a tension spring anchored adjacent to one end of the innermost of the telescopic members, anchoring means so related to the outermost of the telescoping members and to the end of the inner member to which said spring is attached as to cooperate with the spring for normally tensioning the spring for projecting the telescoping members relative to one another, and means for locking said telescoping members together to resist the action of said spring within a substantial range of relative telescopic adjustment of the telescoping members.

3. A vertical adjustment device as defined in claim 2 in which the telescoping members comprise a pair of substantially channel shaped elongated members nested together, and the anchoring means comprises a plate in association with the open side of the outer of the telescoping members and held thereby in clearance relation to the inner of the telescoping members.

4. In combination in a vertical adjustment device of the character described, a pair of substantially channel shaped elongated members telescopically nested together and adapted to be slidably projected relative to one another, means for securing the members in various positions of projected adjustment, one of said members having laterally extending flange means, and means for securing said flange means to apparatus to be vertically adjusted through the medium of said device.

5. In combination in a vertical adjustment device of the character described, a pair of channel shaped elongated members telescopically nested together and adapted to be relatively projected for adjustment, an attachment flange integral with and projecting laterally from the outermost of the telescopic members adjacent the open side, a plate member cooperating with said flange and closing the open side of the outer of the telescopic members and held thereby in clearance relation to the inner of the telescopic members, and a counterbalancing tension spring anchored to the inner of the telescopic members and to the closure plate and adapted normally to draw the telescopic members into relative projected relation.

6. A combination as defined in claim 5 in which the plate member and the attachment flange are provided with matching screw holes and are permanently secured together.

7. In combination in an adjusting mechanism of the character described, inner and outer telescopically related members, biasing means normally operating to drive said members into projected relation, and means for securing said members in selected relative positions of adjustment to which projected, said securing means having an especial interlocking disposition operative in the fully telescoped condition of the members to render said biasing means ineffective and lock the members against projection, the interlocking disposition being such as to remain operative even though the securing means is jarred slightly loose in the course of transportation or the like.

8. A combination as defined in claim 7 in which the securing means comprises a slot in one of said members and a device carried by the other of said members and working in said slot when effecting adjustments of said members, and the interlocking disposition includes a terminal enlargement of the slot in which said device is adapted to be received lockingly.

9. In combination in apparatus of the character described, a pair of horizontally spaced members, a vertical tube secured to and serving as a spacer post for said members, the tube opening downwardly through the lower of the members, and vertical adjustment means projectible from the lower end of the tube.

10. In combination in a vertical adjustment device adapted to be mounted upon the front of a picture projection unit for tilting the latter upwardly from a supporting surface in order to effect registration or centering of the projection axis of the unit relative to a screen or the like, a first structure adapted to be secured fixedly to the front of said unit, a second structure slidably cooperating with said first structure and adapted to be protracted to a substantial distance beyond the bottom of the projection unit for tilting the latter, biasing means tending normally to effect complete predetermined protraction of said second structure relative to the first structure but yieldable in response to the normal weight of the projection unit to attain a condition of perfect counterbalance and thus only partial protraction for correspondingly partial tilting of the projection unit relative to the supporting surface, vertical adjustment both ways from the position attained at perfect counterbalance being achievable by manually altering the weight imposition of the front portion of the projection unit upon the device through supplementing the biasing means for increasing the tilting angle or opposing the biasing means for depressing said angle, and means for locking said structures fixedly against movement from any adjusted relation and thereby rendering the counterbalancing means dormant.

11. An adjustment device as defined in claim 10 in which the protractable second structure has a foot construction extending laterally to opposite sides therefrom and equipped with substantially point contact means adjacent the opposite ends to engage the supporting surface and permit rocking of the foot in the course of the adjusting activity of the device.

OTTO R. NEMETH.

REFERENCES CITED

The following references are of record in the file of this patent:

UNITED STATES PATENTS

| Number | Name | Date |
| --- | --- | --- |
| 117,863 | Chestnutwood | Aug. 8, 1871 |
| 400,033 | Alliger | Mar. 26, 1889 |
| 580,665 | Goshorn | Apr. 13, 1897 |
| 1,240,119 | Burns | Sept. 11, 1917 |
| 1,612,276 | Fitz | Dec. 28, 1926 |
| 1,664,106 | Fisher | Mar. 27, 1928 |
| 1,746,607 | Readeker | Feb. 11, 1930 |
| 2,157,112 | Bonner | May 9, 1939 |
| 2,158,546 | Lang et al. | May 16, 1939 |